United States Patent [19]

Horvath

[11] 3,997,870
[45] Dec. 14, 1976

[54] VEHICLE ANTI-THEFT ALARM SYSTEM
[76] Inventor: Paul J. Horvath, 7733 Monroe Crescent, Vancouver, B.C., Canada, V5S 3J9
[22] Filed: June 2, 1975
[21] Appl. No.: 582,985
[52] U.S. Cl. .............................. 340/63; 307/10 AT
[51] Int. Cl.² ...................................... B60R 25/10
[58] Field of Search ............. 340/63, 64, 331, 274, 340/276; 307/10 AT; 180/114

[56] References Cited
UNITED STATES PATENTS

| 3,247,402 | 4/1966 | Hayden | 340/331 |
|---|---|---|---|
| 3,422,398 | 1/1969 | Rubin | 340/63 |
| 3,513,466 | 5/1970 | Isaacs et al. | 340/274 |
| 3,585,584 | 6/1971 | Behrend | 340/64 |
| 3,824,539 | 7/1974 | Horvath | 340/65 |
| 3,891,967 | 6/1975 | Betts | 340/63 |

Primary Examiner—John W. Caldwell
Assistant Examiner—Joseph E. Nowicki
Attorney, Agent, or Firm—Fetherstonhaugh & Co.

[57] ABSTRACT

An electrical-electronic circuit for operating the horn and headlights of a car in a manner which will give audible and visual warning of a theft attempt. The circuit includes a suitably located tamper switch for each door or other closure member of the car and a number of electronic devices which combine with the tamper switches to control the flow of current between a master switch and a relay switch. The master switch is associated with one of the car door locks and this normally open switch is closed to arm the circuit whenever the key is turned in the lock to secure the door.

4 Claims, 2 Drawing Figures

VEHICLE ANTI-THEFT ALARM SYSTEM

My invention relates to an improved alarm system for cars and the like and more particularly to a circuit which can be connected into the existing circuitry of a vehicle so as to provide both audible and visual warning signals of a break-in attempt.

There are a number of alarm circuits presently available which are intended to give a warning of an illegal attempt to enter a car but many of these are undesirably complicated with the result that such devices are costly and more importantly, are not as reliable as they should be. When an experienced thief encounters a car fitted with mechanical switches, electromagnetic relays and other such electrical devices arranged in a more or less conventional manner, he is sometimes able to deactivate one such device in the circuit so that the alarm does not sound at all or operate for only a brief period insufficient to warn people in the vicinity that the car is being tampered with and this, of course, fails to give the vehicle owner proper theft protection.

I overcome the above as well as other disadvantages of known systems by providing a circuit containing only a few but quite effective electronic devices which are combined with other more commonplace electrical devices to safeguard a car or truck against theft or pilfering. Once the alarm circuit is energized it cannot be shut off merely by opening a tamper switch or otherwise breaking the circuit which a knowledgeable thief will try to do. However, one of the electronic devices and an electrical switch cooperate to deenergize the circuit after a suitable warning period so that there is no unnecessary drain upon the battery of the vehicle. The device can be quickly and easily installed in most vehicles with a suitable number of tamper switches located wherever they are deemed necessary. Furthermore, the tamper switches can be connected into the wiring system of the vehicle to operate either as positive or negative switches, or a combination of both types of switches, so that the installation can be varied as required.

More specifically, the present invention is an anti-theft alarm system for a vehicle having a battery, a horn, headlights and a key-operated door lock comprising a circuit including a master switch operatively connected to the door lock to be closed when said lock is locked by the key, a plurality of tamper switches mounted on the vehicle and each adapted to be closed when a closure member of the vehicle is opened, a relay switch having contacts and closing means therefor operable to connect the horn and the headlights to the battery, a rectifier arranged in the circuit to control current flow from the closed master switch to the closing means, a transistor in the circuit between the rectifier and the closing means, and a thermally controlled timing switch between the rectifier and the transistor adapted to cooperate with said transistor to limit energization of the closing means to a predetermined period.

In drawings which illustrate preferred embodiments of the invention;

Figure 1:
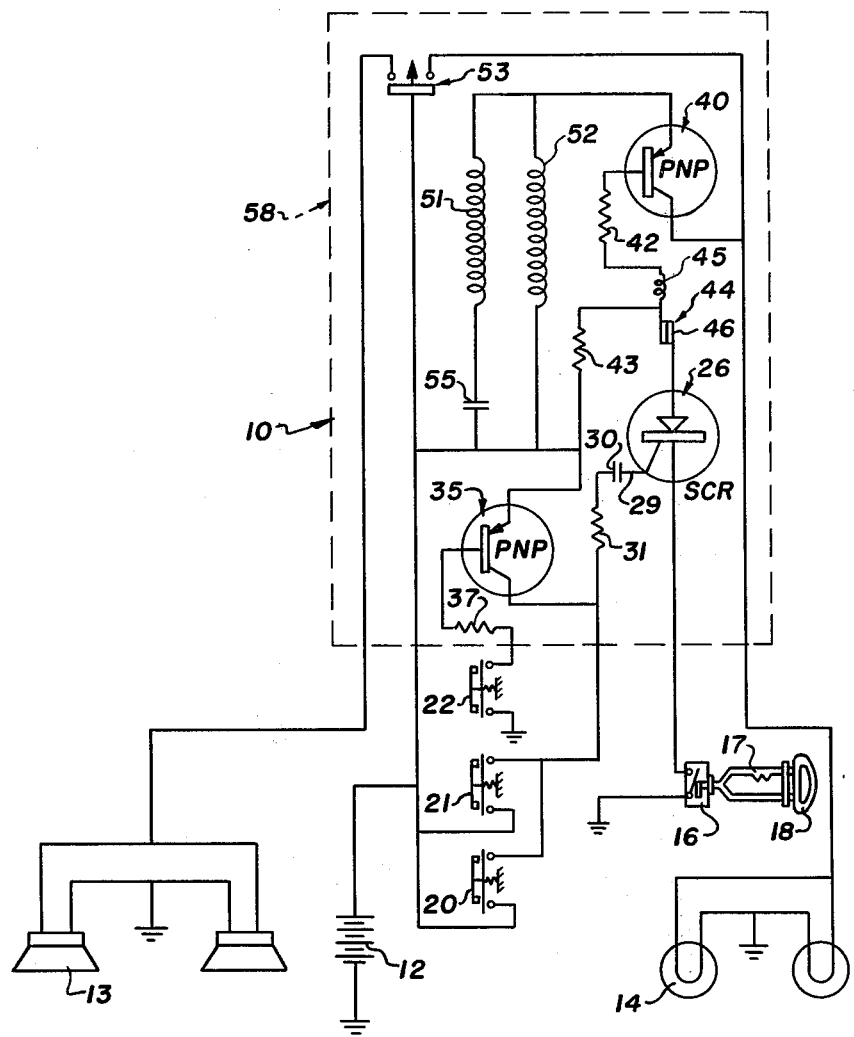
FIG. 1 is a wiring diagram of an anti-theft alarm system.

As illustrated in FIG. 1, the present system comprises a circuit generally indicated at 10 which is adapted to be connected into the appropriate electric circuits of an automobile or other vehicle and included in the circuitry of all conventional cars is a battery 12, either a single horn or the twin horns 13 shown in the drawings, and headlights 14.

Circuit 10 is provided with a normally open master switch 16 which is mounted in a door of the car so as to operate with lock 17 of that door. Preferably the lock fitted with the switch 16 is on the door on the left or driver's side of the car. The conventional barrel-type lock 17 has a key 18 and, when this key is turned in the lock to secure the door, the master switch 16 is closed.

The circuit 10 is shown by way of example as having tamper switches 20, 21 and 22 which preferably are the push-button, normally open type. Tamper switch 20 is mounted on the vehicle so as to be closed whenever one of the doors is opened. For example, switch 20 can be mounted on the jamb of the right front door of the car to be closed should that door be open by illegal means, for example, by breaking a side vent window to provide access to the inside door handle. All other doors of the car, whether lockable or not, are safeguarded by similar switches, not shown, arranged to open in the same manner as tamper switch 20. The switch 21 is mounted in a suitable position in the car to close when the lid of the trunk is raised. The normally open switch 22 is located in a position where it will be closed whenever the hood of the car is opened.

It will be noted that switches 20 and 21 are arranged in circuit 10 to bridge lines leading to the positive side of the battery and therefore those two switches will hereinafter be referred to as positive switches. The tamper switch 22 has one contact grounded to the negative side of battery 12 and therefore the switch will be referred to as the negative switch. Some cars are fitted with switches which are all positive while other vehicles have all negative switches. The tamper switches can be connected into the circuit 10 as positive or negative switches but it is sometimes desirable to have a tamper switch in a remote position such as beneath the hood arranged to operate as a negative switch while the remainder of the tamper switches are positive. For that reason, switches 20 and 21 are shown as positive in the drawings while tamper switch 22 is connected into circuit 10 as a negative switch.

Circuit 10 also includes a silicon controlled rectifier (SCR) 26 provided near the switch 16 and arranged to function as an electronic switch. Gate 29 of the SCR is connected to the tamper switches 20 and 21 by a line provided with a capacitor 30 and a voltage-controlling resistor 31.

A positive-negative-positive (PNP) transistor 35 is the circuit 10 has its base connected to the negative tamper switch 22 by a line which is provided with a voltage-controlling resistor 37. The collector of this transistor is connected to the gate of the rectifier 26 while the transistor's emitter is connected to the positive side of the battery 12.

Another transistor 40 of the same PNP type is provided in the circuit 10 and the base of this electronic device is also connected to the positive side of the battery 12 by a line which includes voltage-controlling resistors 42 and 43 as well as a thermally-operated timing switch 44. The normally closed timing switch 44 has a heating coil 45 and contacts 46 one of which is connected to SCR 26. The collector of the transistor 40 is connected to the negative grounding side of the headlights 14, while the emitter of the device is connected to coils 51 and 52 which form part of a relay switch generally indicated at 53.

The normally open, double pole, single throw, relay switch 53 is closed whenever the coils 51 and 52 are energized and this results in the horn 13 and headlights 14 being connected by appropriate parts of the circuit 10 to the battery 12. Coils 51 and 52 have lines leading to the battery and the line to the first mentioned coil is provided with a condensor 55.

When the driver of a car fitted with the present system parks and locks the vehicle, the circuit 10 is automatically "armed" or set to give both a visual and audible warning of an attempt to steal the car or strip it of its accessories and valuables stored in the passenger or baggage compartments. For example, the thief may break the glass of a door to reach the inside handle but the moment that door is opened the horn sounds and the headlights flash. This occurs because the closed switches 16 and 20 energize the rectifier 26 causing it to change to a conductive state whereupon the circuit is completed through the transistor 40 and coils 51 and 52 to the source of power. The closing of switch 53 as a result of the energization of its two coils supplies power to the horn 13 and headlights 14. Condensor 55 acts alternately to charge and discharge the coil 51 and this serves to similarly open and close the relay switch 53 resulting in an intermittent operation of the lights and horn. The flashing of the headlights 14 and the repeated blasts of the horn are calculated to warn anyone in the vicinity that a thief is tampering with the car.

The circuit 10 operates in the above-described manner for a suitable period of time, which preferably is 45 seconds, and then shuts off the headlights and the horn to prevent unnecessary drain of the battery. This shut-off action occurs when the heating coil 45 of the timing switch 44 reaches a temperature which will separate the contacts 46 and stop current flowing from the rectifier 26 to the transistor 40. As a result, the transistor 40 is deactivated and the circuit 10 is broken to stop transmission of any further warning signals. The heating coil 45 eventually will cool down and the contacts 46 will close once again but, during the period when the circuit 10 is broken, the rectifier 26 reverts to a non-conductive state and the warning is not repeated. It will be noted that the capacitor 30 will allow only enough current to flow to the rectifier 26 to activate that electronic switch once as the result of the closing of a tamper switch and thus the transistor 40 and timing switch are able to shut off the lights and horn at the end of the predetermined cycle.

Circuit 10 operates to give the same visual and audible warning of a theft attempt whenever the other positive switch 21 is closed, assuming the system has been armed as before, but the negative switch 22 energizes circuit 10 is a slightly different manner to achieve the same results. If a thief tries to open the hood of the car, switch 22 is closed to connect the negative side of the battery to the transistor 35. This electronic device 35 is activated to connect the gate 29 of the SCR to the positive side of the battery whereupon the circuit 10 operates as previously described to intermittently turn on and off the headlights and blow the horn.

Figure 2:
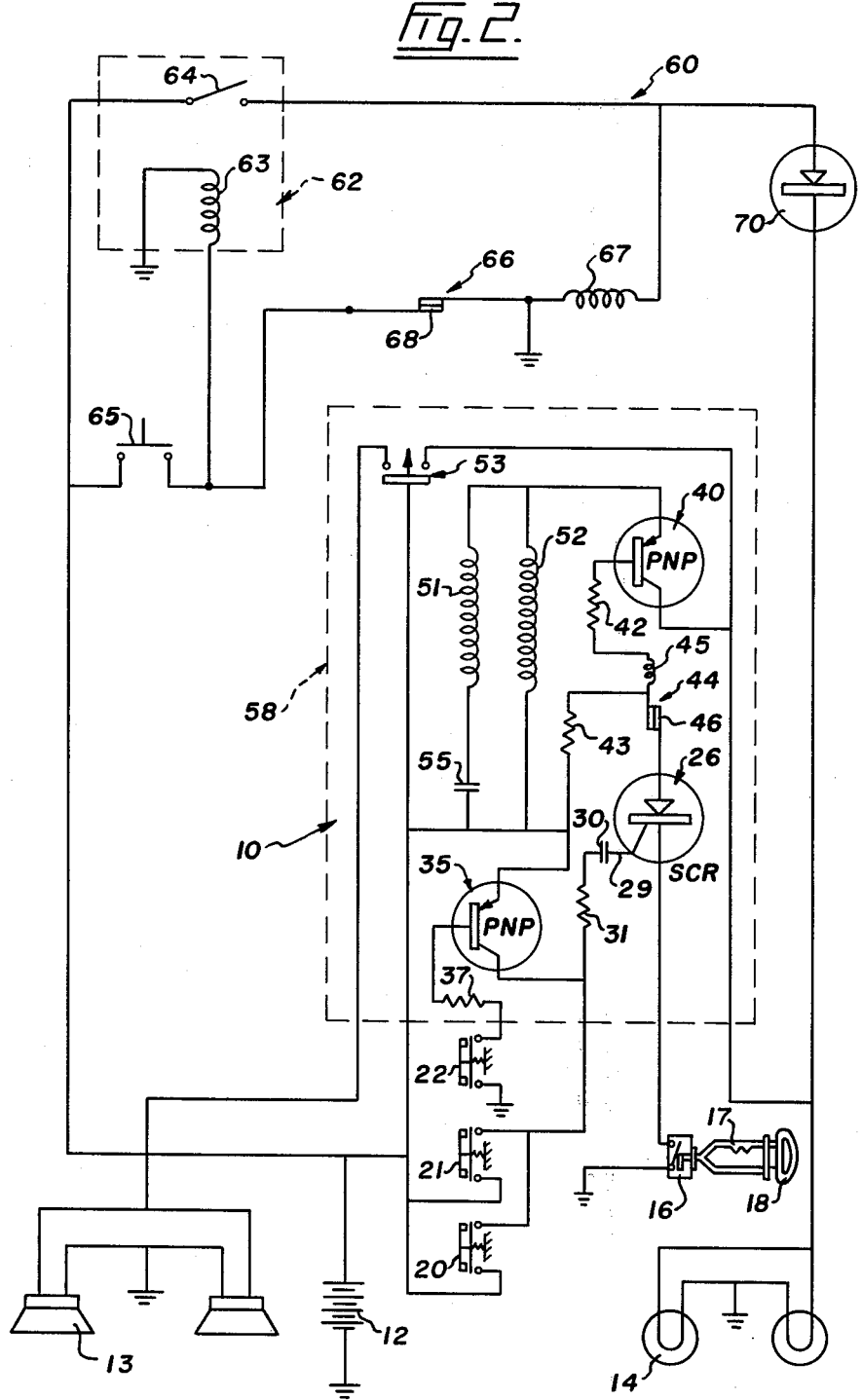
FIG. 2 is a wiring diagram of a modified form of the system.

It will be noted that some of the elements of the circuit 10 are enclosed in a container 58 which is represented by the chain dotted lines in FIGS. 1 and 2 of the drawings. The container 58 is attachable to a convenient part of the vehicle to protect the enclosed elements and also to facilitate the wiring of the present invention into the circuitry commonly found in a car.

Referring now to FIG. 2, the circuit 10 is connected into the car's electrical circuit as previously described to operate in the same manner as before. Circuit 10 of this embodiment of the invention has connected thereto an auxiliary circuit 60 which includes a holding relay 62 having a coil 63 adapted, when energized, to close a normally open switch 64. The circuit 60 also includes a manually-operated, on-off switch 65 preferably of the spring-loaded, push-botton type. A thermally-operated, normally closed switch 66 in circuit 60 has a heating coil 67 and contacts 68. On of the contacts 68 is connected to a diode 70 which is located in a line to the headlights 14.

In addition to operating as a warning that an attempt is being made to illegally enter a parked car, the present system as shown in FIG. 2 provides for delayed operation of the headlights when the driver parks the car in a garage or elsewhere. The driver closes switch 65 to actuate the holding relay 62 and close the switch 64. This connects the battery to the headlights through the diode 70 whih serves to prevent feedback from the headlights. The heating coil 67 eventually reaches a temperature which will open the switch 66 and this deenergizes the coil 63 so that the switch 64 opens to turn off the headlights. Thus, the lights of the car are turned off after a predetermined interval which allows the owner time to lock the garage if need be and walk to the house.

From the foregoing, it will be apparent I have provided an alarm system which should effectively frighten off any would-be thieves. The system is compact and inexpensive as well as versatile due to the alternative use of negative and positive tamper switches. All the electronic devices used in the circuit of the system are known for their reliability and since they draw only a very small amount of current they have an extremely long operating life. The system cannot be rendered inoperative by a thief who might force open a door, for example, and then immediately open the tamper switch closed as a result of the door opening. Once the rectifier is activated even by a momentary flow of current, the circuit is energized and the warning is given for the normal 45 second period.

I claim:

1. An anti-theft alarm system for a vehicle having a battery, a horn, headlights and a door lock operable by a key, comprising a circuit interconnecting said battery, horn and headlights and also including a master switch operatively connected to the door lock to be closed when said lock is locked by the key, a plurality of tamper switches mounted on the vehicle and each adapted to be closed when a closure member of the vehicle is opened, a relay switch having contacts and a pair of coils adapted to close said contacts when energized, one of said pair of coils being series-connected with a condensor whereby the relay switch is alternately closed and opened to operate the horn and headlights intermittently; a rectifier connected by the circuit to the master switch, the tamper switches, and the pair of coils; a transistor connected by the circuit to the rectifier and the pair of coils, a timing switch for controlling current flow from the rectifier to the transistor, said timing switch cooperating with said transistor to limit energization of the pair of coils to a predetermined period, and a capacitor associated with the rectifier whereby said rectifier is changed from a non-conductive to a conductive state only once in response to closing of a tamper switch through preventing continued operation of the horn and headlights after the timing switch has reclosed at the end of the predetermined period when one of the tamper switches is left closed.

2. An anti-theft alarm system as claimed in claim 1, and including a second circuit connected to the first described circuit and cooperating therewith in the operation of the headlights, said second circuit comprising a manually operated on-off switch, a thermally-controlled timing switch, and a relay switch having a normally-open contact and a coil adapted to closed said contact when energized, the aforesaid elements being arranged in the second circuit to allow operation of the headlights for a predetermined period after the on-off switch is closed.

3. An anti-theft alarm system as claimed in claim 2, and including a diode arranged in said second circuit to prevent feedback from the headlights.

4. An anti-theft alarm system as claimed in claim 1, in which all but one of said tamper switches are connected to the same terminal of the battery, said one tamper switch being connected to the other terminal of the battery, and a second transistor associated with said one tamper switch whereby the circuit is energized to operate the horn and headlights in response to closing of the said one tamper switch.

* * * * *